No. 797,965. PATENTED AUG. 22, 1905.
J. V. P. LAGRANGE.
PROCESS OF MAKING SUGAR.
APPLICATION FILED NOV. 10, 1902.
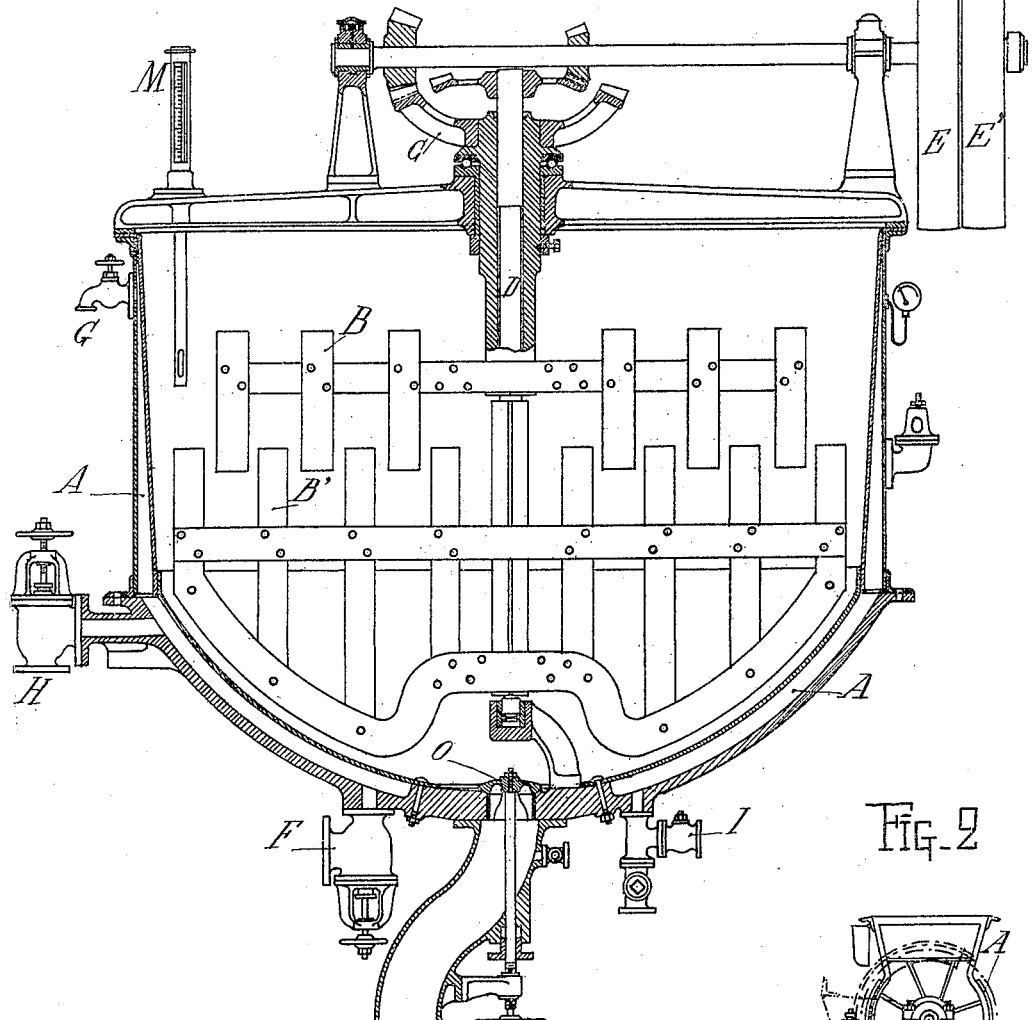
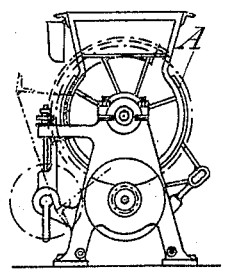

UNITED STATES PATENT OFFICE.

JEAN VINCENT PROSPER LAGRANGE, OF PARIS, FRANCE.

PROCESS OF MAKING SUGAR.

No. 797,965.          Specification of Letters Patent.          Patented Aug. 22, 1905.

Application filed November 10, 1902. Serial No. 130,752.

*To all whom it may concern:*

Be it known that I, JEAN VINCENT PROSPER LAGRANGE, a citizen of the French Republic, residing at Paris, France, have invented an Improved Process of Manufacturing Sugar, of which the following is a full, clear, and exact description.

My process for the extraction and instantaneous crystallization of sugar, which forms the subject of the present invention, is dependent upon a number of physical phenomena producing absolutely new results which cannot be obtained by any of the methods ordinarily heretofore known and used in sugar factories and refineries.

The characteristic feature of my invention is the instantaneous crystallization in free air of the sugar in a supersaturated syrup under the combined action of refrigeration obtained by means of a current of cold water and of the disturbance of the crystallization by the agitation of the mass, whereby boiling in a vacuum apparatus is avoided. This gives results superior to the ordinary processes, effects a notable economy of fuel, and enables the weight of the molasses to be largely diminished.

In the drawings I have shown an apparatus for carrying out my process.

In the drawings, Figure 1 is a vertical sectional view, partly in elevation, of an apparatus for carrying out the process; and Fig. 2 is a side elevation of a modified construction of apparatus.

In the drawings, B B' indicate agitators revolving in opposite directions. C indicates the driving-gear for the agitators; D, a shaft carrying the agitators; E, a fixed pulley; E', a loose pulley; F, an inlet-pipe for water provided with a regulating-valve; G, an outlet for the water; H, an inlet for steam; I, an outlet for steam and condensed water; M, a thermometer for taking the temperature of the mass, and O a discharge-valve.

The shape of the apparatus may vary. The essential feature is that it should be jacketed over its entire surface and have means for admitting water and steam and an agitating device and the other adjuncts mentioned above.

The apparatus seen in Fig. 2 is adapted to be swung over, this form being adapted for small masses which are treated therein.

In fact I only prepare the syrup in the boiling apparatus, a preparation which might also be effected in a boiler in free air. I bring it by gradual concentration, reducing the vacuum and without forming grains and then in free air, to a temperature of 110° to 115° centigrade, and even higher, according to its richness, up to the precise moment indicated by the thermometer, when I pour it into a jacketed pan or boiler A, Fig. 1, provided with agitators B B', a thermometer M, an inlet for water F, an inlet for steam H, and other usual fittings of a like kind, and into the syrup contained in this apparatus in free air—that is, without pressure or vacuum—I introduce sugar (preferably pulverized) in order to cause by its complete solution a supersaturation of the syrup. This sugar of supersaturation is added in the proportion of ten to sixty per cent. of the sugar which the syrup contains. To destroy equilibrium of this large quantity of sugar held in solution by reason of the maintenance of this high temperature, I cause, as stated above, two combined actions to intervene—that is to say, the disturbance of the crystallization by a sufficiently rapid movement and by a more or less retarded refrigeration by a current of cold water in the jacket A, the volume of which is regulated, and which I shut off at the precise point of running off, as indicated by the thermometer.

In my experiments I found that in order to obtain the results which I describe it was necesary to venture upon high temperatures, accurately fixed, without the formation of invert sugar, temperatures which alone allow the syrup submitted to them to first become supersaturated, and then to give a regular crystallization having large or small grains by causing the two physical actions which were spoken of above to intervene simultaneously—viz., the disturbance of the crystallization by movement and the lowering of the temperature by methodical refrigeration—which cause the precipitation of the sugar in regular crystals. These preliminary and technical explanations were indispensable before bringing forward my new theories of the formation of the grain independent of the boiling apparatus, which are in absolute contradiction to the old industrial methods which have been retained up to the present time.

To more fully set forth my invention, I will describe the same in its application to the treatment of beet-root and sugar-cane and also as used in sugar-refineries.

In the treatment of beet-root and sugar-cane I take the syrup as it leaves the process well known in sugar-making as the "triple" or "multiple" effect, and I pass it into the apparatus which ordinarily serves for the boiling to grain. I push the evaporation in vacuum until the ordinary test shows no formation of grain. I then gradually decrease the vacuum and I observe on the thermometer the temperature, which immediately rises. When a 100° centigrade is reached, I stop the vacuum by closing the communication with the condenser, and always keeping it at the sugar-boiling point I bring the syrup to ebullition. This taking place in free air, I rapidly reach the temperatures of 100°, 113°, 114°, and 115° centigrade and even higher, according to the richness of the syrups and the product which it is desired to manufacture. If, for example, the temperature of 115° centigrade has been determined by experience for treating syrups of the first spinnings, the discharge into the jacketed pan is effected in free air, taking care to preserve as much as possible the initial temperatures of these syrups and their point of concentration, or at least and in every case insuring that this temperature shall not fall below 100° centigrade. Water and steam can be alternately introduced, according to requirements, into the jacket A of the pan, which enables the temperature of the syrup to be exactly regulated. An agitator is arranged in the inside to facilitate the mixture of the supersaturating sugar and to interrupt the crystallization when the syrup is supersaturated. This supersaturating sugar is introduced in any suitable way. A thermometer M, fixed to the pan, shows the progress of the operations. As the solution of the sugar proceeds the thermometer is watched. The cooling which is produced lowers the temperature, which is maintained at a minimum of 108° centigrade as long as the supersaturation lasts. When the supersaturation appears to be complete, the steam-inlet valve is closed and the water-inlet is opened. The agitators continue to work during the whole of the operation until the completion of the discharge. The disturbing action shows as soon as the cold water reaches the jacket and lowers the temperature of the contained mass. This is also the important moment which should determine the precipitation of the sugar, the formation and the caliber of the crystals, as well as their extent or proportion. Many factors concur by different actions to obtain these results. First, the degree of temperature to which the syrups are concentrated; second, the degrees of supersaturation of these syrups; third, the time employed in their cooling; fourth, lastly, the degree of temperature at which the cooling is stopped. Large crystals are produced by dissolving the maximum of sugar of supersaturation in the syrup concentrated in free air at determined temperatures and by retarding the speed of current of cold water in the jacket. The crystals form and increase in size, according to the process of the refrigeration indicated by the thermometer, and their yield depends, on the one hand, on the quantity of water which is left in the syrup concentrated in free air—on the other hand, on the degree of temperature at which the refrigeration—that is to say, the precipitation of the sugar—is stopped. The examination of the thermometer will also show the density of the crystalline mass at the precise moment when it is passed to the centrifugals. In fact, it is the opposite to what takes place in the vacuum boiling apparatus, where the density of the mass treated is obtained exactly in proportion to the evaporation of the water, while in my operation, on the contrary, the density of the crystalline mass is obtained by the precipitation of the grain produced by the refrigeration and agitation, and this is why the indication of the thermometer is valuable and indispensable for the completion of the operation. To sum up, the quantity of water to be left in the crystalline masses depends upon the temperature of concentration in free air, while the final yield will depend upon the temperature at which the refrigeration of the mass— that is to say, the precipitation of the sugar— is stopped. If, for example, it is stopped at 60° centigrade, and this temperature is maintained by stopping the current of cold water while the mixing of the mass is continued, no more sugar will be precipitated; but the crystals in suspension in the mother liquid will simply be kept up or "nourished."

In certain countries of America, Asia, and Oceania there are sugar factories not yet provided with vacuum apparatus for the juice and the treating of the grains in a vacuum. In these factories the juices are simply evaporated and concentrated in the pans in free air, and when the usual test shows that they have reached the proper point crystallization is carried on in the vats of the usual storehouses for some days and even weeks, and a red, impure, and badly-crystallized sugar is extracted by the centrifugal. My new process is adapted to afford a very great service to these factories by enabling them after an initial concentration determined by a thermometer by my method of supersaturation and instantaneous crystallization by refrigeration and agitation or disturbance to obtain sugar in grains as white and as pure as in a vacuum boiling apparatus, with the difference that the grain is obtained by means of a current of cold water, while with the ordinary apparatus a considerable quantity of steam is required both for the engine driving the air-pump and for supplying the coils of the apparatus. There is, therefore, through this difference in the mode of working, great economy of fuel and of time and a much larger yield of the first spinnings, seeing that the precipitation of the sugar may be pushed as far as possible, leaving in it a minimum of water and producing a white sugar well crystallized and very pure.

In the treatment of the second spinnings or thin syrups coming from the turbine the syrups of the second spinnings are, on leaving the centrifugal machine, returned to the general circulation—that is to say, to the vessels—to be brought after evaporation by concentration in free air to the temperatures which I have given above until analysis indicates a too strong proportion of non-saccharine impurities in these syrups. An instantaneous and definite liquidation of them is then effected by submitting them to the same treatment as that of the first spinnings, but with this difference, that the temperature of concentration in free air will be higher in proportion as the syrups are poorer in sugar. The syrups of the second spinnings may also be treated directly and their exhaustion obtained by following the course pointed out for the treatment of syrup of the first throwing.

In the countries mentioned above by reason of the aromatic taste of the cane an inferior sugar is manufactured with the second spinnings, which for the most part is in the form of an amorphous powder. By my process I can increase the richness and the yield of the second spinnings and increase the value of the molasses by transforming it by my method of supersaturation into a crystallized and aromatic product. For this purpose I evaporate the discharge from the centrifugals and concentrate them under the same conditions in free air as the preceding ones. I push this concentration to a temperature the higher as the syrup is poorer. I obtain in the jacketed pan precipitation and instantaneous crystallization in the conditions described above. After treatment by the centrifugal of the crystalline mass from these second spinnings, which is done immediately, the third spinnings is sent at once to the concentrating apparatus in free air. When the point for discharge into the pan has been reached, the molasses is supersaturated by making it dissolve the maximum of sugar up to sixty per cent. of the weight of sugar contained in the said molasses. The grain will be the larger as the point of supersaturation is higher. The normal molasses, which on account of its degree of purity could not without previous supersaturation give any precipitation of grains, is transformed, on the other hand, with the greatest facility and in proportion to the lowering of the temperature into excellent crystals, and if the cooling is continued to the moment when the entire mass is effected a crystalline product is obtained of a yellow amber color highly aromatic and excellent for consumption, containing only two per cent. of water. By applying, therefore, my novel methods to the manufacture of cane-sugar the manufacture results in two spinnings, containing all the elements of the molasses perfectly crystallized and very suitable for consumption and highly aromatic, and these transformations are accomplished immediately by successive operations, so that directly the last treatments of the sugar-cane are completed the factory-fires may be extinguished and all work left off. The same is the case in beet-root-sugar factories. After the liquidation of the second spinnings, which are taken back a certain number of times and added to the juices, there is obtained or treated directly as the manufacture progresses, after the last beet-roots have been used, a product containing the whole of the sugar and a residue which is only a fraction of the weight of the normal molasses.

In using my invention in refineries I obtain by my novel processes refined fine-grained sugar by evaporating first in vacuum the decolorized material perfectly filtered and limpid, and I then conduct the concentration by the same method as that which I have described for the sugar-factory. The pan serving for the reactions is just the same and jacketed, as well as the agitator, thermometers, and inlets for cold water and steam.

To obtain a fine-grained product, I operate in a somewhat different way from that in the sugar-factory. The proportion of supersaturation of sugar exercising upon the size of the grain great influence and, on the other hand, the time of the refrigeration also playing a certain part, it is best to dissolve in the concentrated syrup a less proportion of the pulverized supersaturation sugar—say about thirty to forty per cent. of the sugar which the syrup contains—and to accelerate the current of cold water in the jacket, a speed being given to the agitator of about twenty-five to thirty turns a minute. If it is desired to mold the crystalline mass in the form of loaves, the temperature of this mass must be lowered to 80° centigrade, for instance. It is then reheated to 85° or 88° centigrade after having stopped the current of water. It will then be taken to the vats or vessels in the storing-house, ("emplis.") If it is desired, on the other hand, to pour the crystalline mass into what are well known as "Adant" molds, or the centrifugals known as "Hubner Schroeder," or others of the kind, the temperature is stopped at about 75° centigrade and then raised again to 90° centigrade, the filling into molds or centrifugals of the kinds mentioned being then effected in the ordinary way. For the manufacture of refined sugar in blocks the temperature of the mass may be stopped at a lower point to obtain more grains—say about 70° centigrade—and then the product poured into mixers which supply the centrifugals, or into small crystallizing vessels, the masses being allowed to cool for some hours in order to increase the yield. The fine grain is then treated by the centrifugal and should not contain more than three to four per cent. of water, so as to enable it to be molded in presses of the kind known as "Borssat's" or others.

*Treatment of molasses or low products.*— The second spinnings, called "molasses," cannot, as in ordinary sugar-making, be used over again. I submit then, therefore, to a treatment exactly similar in its working to the preceding operation, but different as consisting of concentration in free air with supersaturation in the jacketed pan. The degree of concentration is pushed to a higher temperature, and the supersaturation is done with a maximum of sugar, and in order to insure a good final yield the cooling or precipitation of the sugar is stopped at a much lower point. There results a very strong crystallization of the sugar and a yield showing the most complete exhaustion of the molasses.

What I claim is—

1. The herein-described improvement in the art of sugar-making, which consists in supersaturating in free air the syrup to be treated by adding sugar thereto and while said syrup is heated as described, then reducing the temperature of the supersaturated syrup and simultaneously agitating the same until crystallization of the sugar takes place.

2. The herein-described improvement in the art of making sugar which consists in subjecting the concentrated syrup to evaporation in a vacuum for the period described, then gradually decreasing the vacuum and increasing the temperature of the syrup as described, then boiling the syrup, then supersaturating the same in free air by adding sugar to the mass and while the latter is in a heated condition, then reducing the temperature of the supersaturated syrup and simultaneously agitating the syrup until crystallization of the sugar takes place.

In testimony that I claim the foregoing I have hereunto set my hand this 6th day of October, 1902.

JEAN VINCENT PROSPER LAGRANGE.

Witnesses:
EDMOND LECOUTURIER,
EDWARD P. MACLEAN.